United States Patent
Corazzari

(10) Patent No.: US 12,508,356 B2
(45) Date of Patent: Dec. 30, 2025

(54) PRESSURE CELL HOLDER FOR AN EXTRACORPOREAL BLOOD TREATMENT MACHINE

(71) Applicant: B. Braun Avitum AG, Melsungen (DE)

(72) Inventor: Enrico Corazzari, Modena (IT)

(73) Assignee: B. Braun Avitum AG, Melsungen (DE)

( * ) Notice: Subject to any disclaimer, the term of this patent is extended or adjusted under 35 U.S.C. 154(b) by 983 days.

(21) Appl. No.: 17/637,130

(22) PCT Filed: Aug. 20, 2020

(86) PCT No.: PCT/EP2020/073379
§ 371 (c)(1),
(2) Date: Feb. 22, 2022

(87) PCT Pub. No.: WO2021/037687
PCT Pub. Date: Mar. 4, 2021

(65) Prior Publication Data
US 2022/0296798 A1    Sep. 22, 2022

(30) Foreign Application Priority Data
Aug. 23, 2019    (DE) ...................... 10 2019 122 705.4

(51) Int. Cl.
*A61M 1/36*    (2006.01)
*A61M 1/16*    (2006.01)
*A61M 39/10*   (2006.01)

(52) U.S. Cl.
CPC ........ *A61M 1/3639* (2013.01); *A61M 1/1603* (2014.02); *A61M 1/1621* (2014.02);
(Continued)

(58) Field of Classification Search
CPC .............. A61M 1/3641; A61M 1/1603; A61M 1/1621; A61M 1/3639; A61M 39/10
See application file for complete search history.

(56) References Cited

U.S. PATENT DOCUMENTS 5,954,707 A * 9/1999 Kanesaka ........... A61M 25/002
                                                    604/523
8,210,049 B2   7/2012 Brugger
(Continued)

FOREIGN PATENT DOCUMENTS

DE    202004020869 U1    4/2006
DE    102006016846 B4    2/2010
(Continued)

OTHER PUBLICATIONS

Translation of JP2010-259538.*
(Continued)

*Primary Examiner* — Helen C Kwok
(74) *Attorney, Agent, or Firm* — Christopher A. Rothe; CM Law

(57) ABSTRACT

A pressure cell holder for attachment to a housing of an extracorporeal blood treatment machine, such as a dialysis machine. The pressure cell holder includes a gripping device for holding a pressure cell inserted into the pressure cell holder by enclosing or engaging the pressure cell, and an ejector mechanism for ejecting the pressure cell when the gripping device is released.

18 Claims, 7 Drawing Sheets

(52) U.S. Cl.
CPC .......... *A61M 1/3641* (2014.02); *A61M 39/10* (2013.01); *A61M 2209/082* (2013.01); *A61M 2230/30* (2013.01)

(56) References Cited

U.S. PATENT DOCUMENTS

| | | | |
|---|---|---|---|
| 2006/0130617 | A1 | 6/2006 | Mamourian |
| 2007/0234817 | A1* | 10/2007 | Brucksch ............ A61M 1/3639 73/756 |
| 2008/0234623 | A1 | 9/2008 | Strauss et al. |
| 2010/0275673 | A1* | 11/2010 | Kouda ................ A61M 1/3641 73/1.57 |
| 2012/0111368 | A1 | 5/2012 | Rahimy et al. |
| 2015/0306299 | A1* | 10/2015 | Stuva ...................... A61M 1/16 604/121 |
| 2016/0287857 | A1* | 10/2016 | Weber ................... F16L 37/248 |
| 2020/0197583 | A1* | 6/2020 | Igarashi .......... A61M 1/362261 |

FOREIGN PATENT DOCUMENTS

| | | |
|---|---|---|
| EP | 1843140 A2 | 10/2007 |
| EP | 2233164 A1 | 9/2010 |
| JP | H03254754 A | 11/1991 |
| JP | 2010259538 A | 11/2010 |
| WO | 2005068963 A1 | 7/2005 |
| WO | 2007020106 A2 | 2/2007 |
| WO | 2012052467 A2 | 4/2012 |
| WO | 2014099767 A1 | 6/2014 |
| WO | 2018230545 A1 | 12/2018 |

OTHER PUBLICATIONS

Wikipedia "Bajonettverschluss" version Aug. 7, 2019, URL: https://de.wikipedia.org/wiki/Bajonettverschluss, with translation, 8 pages.
Written Opinion received in International Application No. PCT/EP2020/073379 dated Nov. 27, 2020, with translation, 12 pages.
Search Report received in German Application No. 10 2019 122 705.4 dated May 7, 2020, with translation, 14 pages.
Search Report received in International Application No. PCT/EP2020/073379 dated Nov. 27, 2020, with translation, 5 pages.
Communication received in European Application No. 20 760 818.3-1004 dated Dec. 3, 2024, with translation, 9 pages.
Office Action received in Chinese Application No. 202080072011.4 dated Oct. 30, 2024, with translation, 15 pages.

\* cited by examiner

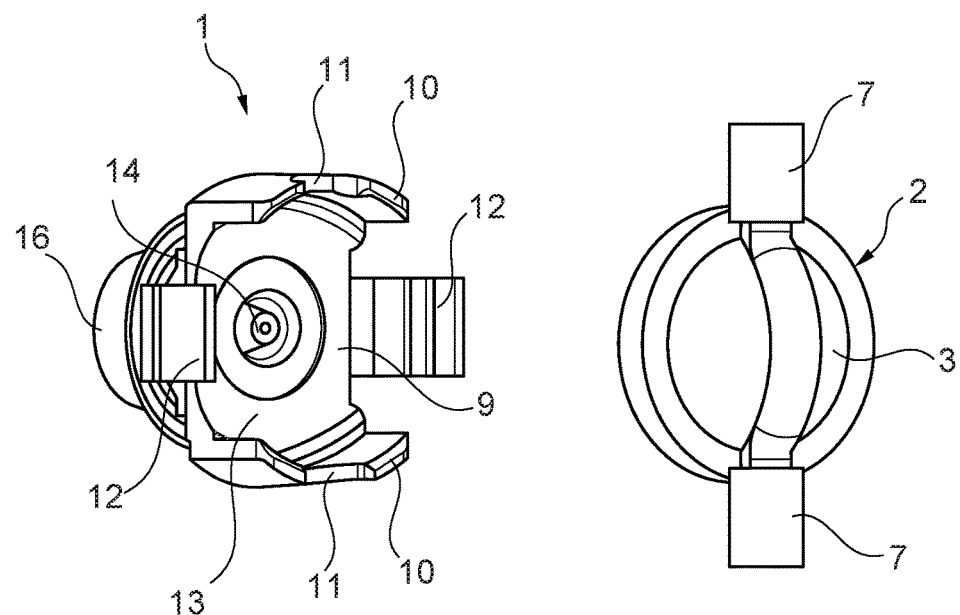
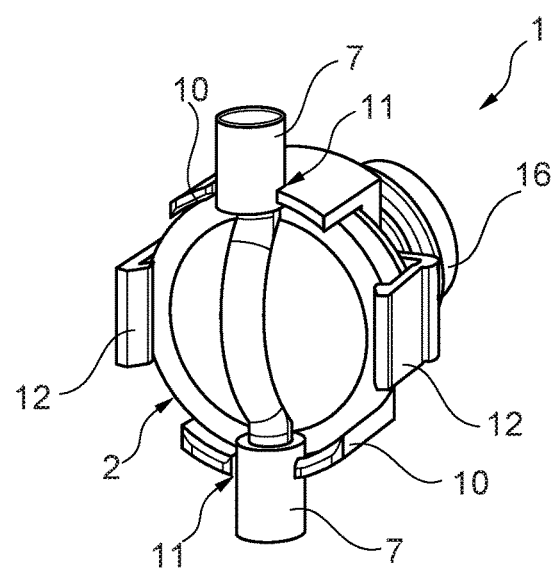

PRESSURE CELL HOLDER FOR AN EXTRACORPOREAL BLOOD TREATMENT MACHINE

CROSS-REFERENCES TO RELATED APPLICATIONS

This application is the United States national stage entry of International Application No. PCT/EP2020/073379, filed Aug. 20, 2020, and claims priority to German Application No. 10 2019 122 705.4, filed Aug. 23, 2019. The contents of International Application No. PCT/EP2020/073379 and German Application No. 10 2019 122 705.4 are incorporated by reference herein in their entireties.

FIELD

The present invention relates to a pressure cell holder, which is attached or attachable to a housing of an extracorporeal blood treatment machine, in particular a dialysis machine, with a gripping device adapted to grip around or engage a pressure cell inserted into the pressure cell holder.

BACKGROUND

Extracorporeal blood treatment machines, in particular dialysis machines, have a conduit system, in particular with a dialysis fluid circuit as well as an extracorporeal blood circuit. These circuits have a number of dialysis fluid and blood (hose) lines which pass through and/or connect various functional units of the extracorporeal blood treatment machine, such as a dialyzer, blood pumps, etc. In order to ensure smooth functionality of the extracorporeal blood treatment machine, this conduit system, in particular the blood hose lines, has to be pressure monitored at several points. For example, in a common dialysis machine, a PA-port is provided to monitor the arterial negative pressure, a PBE-port is provided to monitor the inlet pressure upstream of the dialyzer, and a PV-port is provided to monitor the venous pressure.

For the purpose of pressure monitoring, pressure cells or so-called PODs (Pressure Operated Directional (valve)) are often installed at suitable points in the lines or blood hose lines, such as in systems marked under the registered trademarks MEDISYSTEMS® and STREAMLINE®. Corresponding PODs or pressure transducer capsules have a volume-rigid capsule, which is divided by a membrane into two chambers, more precisely into a blood chamber connected to a blood conduit system and a fluid chamber, more precisely a gas or air chamber, which is connected via a thin hose or a pressure transmission line to a pressure sensor or an associated port of the extracorporeal blood treatment machine. Corresponding ports are typically equipped with Luer connectors, which require screw actuation to connect the pressure transmission line. Since the pressure transducer capsules are suspended in the hose lines of the conduit system and thus float in unstable positions that are not precisely defined, measurement inaccuracies may occur. During operation, an internal line pressure present in the conduit system and thus in the first chamber is transmitted via the membrane to the second chamber, in which a fluid pressure, in particular a gas pressure, is generated that is dependent on the internal line pressure. The pressure sensor connected to the second chamber via the thin hose thus receives a fluid pressure signal, which it converts into an electrical signal. The thin, flexible hose, which forms a large fluid path or air path and a dead volume between the pressure transducer capsule and the pressure sensor, creates a low-pass effect, so that the accuracy of the measurement and a response time of the pressure sensor are disadvantageously limited.

Alternatively, it is known from DE 10 2006 016 846 B4 to directly connect pressure cells with an air side (without an intermediate hose) to a pressure sensor. Furthermore, WO 2014/099 767 A1 and U.S. Pat. No. 8,210,049 B2 disclose detachable holders for a pressure cell, which are attached to a housing or a permanent frame. This means that pressure transducer capsules or PODs are known, which are connected to the pressure sensor directly or via a volume-rigid, short connection. The disadvantage of this is that the connections exemplarily mentioned therein, such as a Luer-lock connection or a bayonet connection, are complex to assemble and/or disassemble and/or requirements for the tightness of the connection may not be met. For example, a Luer-lock connector has to be screwed and is therefore time-consuming to assemble, and furthermore, if the screw connection is tightened too much, the individual Luer components might be pressed firmly onto each other, making them difficult to disassemble or even damaging them. In summary, today's systems with a Luer lock connection can assume the states open/disconnected, tight/closed, or loose/leaky (not properly connected).

SUMMARY

The object underlying the present invention is to improve or eliminate disadvantages of the prior art. In particular, a pressure cell holder is to be provided which enables pressure cells to be easily assembled and disassembled and, in particular, nevertheless provides a very tight connection to a fluid chamber, in particular an air chamber, of a pressure cell.

More precisely, the object is solved by a pressure cell holder which is attached or attachable to a housing of an extracorporeal blood treatment machine, in particular a dialysis machine. A gripping device adapted to grip around or engage a pressure cell inserted into the pressure cell holder and an ejection mechanism adapted to eject the pressure cell upon release of the gripping device are provided. An interior space of the pressure cell is in particular separated by a membrane into a blood chamber and a fluid chamber. Preferably, the pressure cell holder has a pressure transmission line, which is configured to be fluidically connectable to the fluid chamber of the pressure cell and to transmit a fluid pressure present in the fluid chamber to a pressure sensor of the extracorporeal blood treatment machine.

The pressure transmission line is, for example, a pressure transmission channel which can be connected to the fluid chamber at its line/channel end facing the possibly inserted pressure cell, in particular when the capsule/cell is inserted into the holder (automatically/without an assembly step to be carried out in addition to insertion). In addition, the pressure transmission channel (at a channel/line end opposite the possibly inserted pressure cell) may have a port which can be connected to a further (pressure transmission) line or directly to a pressure transducer (pressure sensor).

In other words, a gripping device or a holding device is provided which holds a pressure cell (capsule/cell for short) and has a mechanism which, upon simple removal of the capsule from the pressure cell holder (holder for short) by a user, automatically achieves ejection of the capsule, i.e., the capsule is automatically moved out of the holder by a simple actuation by the user in such a way that a renewed simple actuation is necessary to bring the capsule back into engagement with the gripping device. If applicable, the ejection mechanism also at least partially releases a gas-tight connection between the capsule and a pressure transmission line/channel of the extracorporeal blood treatment machine.

For example, the ejection mechanism is at least partially formed by a spring mechanism. In this case, the capsule is held against a restoring force of the spring mechanism, which presses the capsule out of the pressure cell holder as soon as the gripping device is released, even in the case that frictional forces or the like are present. In particular, in this case a spring deflection is to be provided which is sufficiently long to allow a user to easily grip the pressure cell or, preferably, to allow the pressure cell to be completely ejected from the pressure cell holder and to hang only on the lines attached to it.

The pressure cell holder according to the invention, in particular the interaction between the gripping device and the ejection mechanism, in particular the spring mechanism, achieves on the one hand a very precise, stable positioning of the capsule without the holder having to be additionally adjusted, which enables quick and easy assembly of the pressure cell, and on the other hand ensures that the pressure cell can be quickly and easily assembled and disassembled. Furthermore, the fact that the capsule can be held in the holder in a defined manner and can be ejected in a targeted manner by the ejection mechanism means that a condition can be avoided in which there is a loose/leaky connection between the pressure transmission line and the fluid chamber (e.g. due to an incorrectly connected Luer lock connection). I.e., by targeted ejection, there are only the states 'connected' and 'not connected'. Furthermore, in particular, engagement of the pressure cell upon insertion thereof in the holder provides haptic and/or visual and/or audible feedback for correct connection. Various embodiments of the invention in which corresponding engagement can be achieved are described in more detail below.

In yet other words, a pressure cell holder, which is attached to or is part of a housing of an extracorporeal blood treatment machine, has a device for holding a pressure cell in a form-fit manner and one or more elements, e.g. springs or guide links, which generate a force acting against the insertion direction. This/these element(s) are provided/mounted in the pressure cell holder in such a way that, at least during the release of the capsule from the holder, a pressure cell held or inserted therein can be subjected to a pressure force (spring force) acting counter to an insertion direction (i.e., from the inside to the outside) in which the pressure cell can be inserted into the holder. This supports the removal of the capsule from the holder or causes the capsule to be ejected. Preferably, the pressure cell is inserted into the pressure cell holder from the front or on a front panel of the housing of the extracorporeal treatment machine so as to be clearly visible and easily accessible. However, it may also be inserted from the side, from above or from below (i.e., parallel to the housing).

Since the pressure cell holder is mounted or integrated directly on the outside of the housing of the extracorporeal blood treatment machine, it can furthermore be ensured that the fluid or air chamber of the pressure cell is connected via a short, rigid pressure transmission line to a pressure sensor which is provided on the inside of the housing (inside the housing of the extracorporeal blood treatment machine), preferably directly behind the pressure cell holder, and converts a pressure signal from the pressure cell into an electrical measurement signal. Accordingly, due to the arrangement of the pressure cell in the pressure cell holder, highly accurate, reliable pressure measurement is possible during operation of the extracorporeal blood treatment machine.

The ejection mechanism, in particular the spring mechanism, can provide a pressure force for ejecting the pressure cell by mounting at least one compression spring in the holder in such a way that it is seated in the insertion direction behind a pressure cell inserted therein. Alternatively, an arrangement with a tension spring is also conceivable. Mechanical springs such as coil springs, bending springs/leaf springs or disc springs (i.e., an elastically deformable component that provides an elastic restoring force in the deformed state) or pneumatic springs may be used individually or in combination (connected in parallel and/or in series) as springs for the spring mechanism. Possible embodiments of the gripping device will be described in more detail later.

According to a preferred aspect of the invention, the ejection mechanism comprises a spring mechanism having a pressure element or a pressing component which is spring-mounted in such a way that it is pre-tensioned upon insertion of the pressure cell and presses against the pressure cell in a holding state in which the pressure cell is held by the gripping device.

In other words, the spring mechanism is designed to press against the pressure cell from the rear (with respect to the insertion direction in which the pressure cell is inserted into the holder), i.e., substantially between the housing and the pressure cell. Furthermore, it is not the springs that press directly against the pressure cell, but an intermediate piece in the form of the pressure element is provided, whereby an ejection force generated mechanically by the spring can be transferred evenly and gently to the pressure cell. For this purpose, the pressure element may, for example, be annular and abut an outer edge of the pressure cell and/or may form a trough for receiving a body of the pressure cell. The pressure element preferably has a metal (particularly pressure-resistant) rod.

Preferably, the gripping device is mounted on the housing via a shaft, wherein the pressure element is received in the shaft and is spring-mounted. A diameter of the shaft may substantially correspond to an extension of the gripping mechanism, making the resulting connection particularly robust, providing ample space for (partially) receiving the spring mechanism or the pressure element and avoiding unnecessary intersections and edges, or may be substantially narrower than the pressure cell holder, which is more cost-effective and lighter. A specific distance between the housing and the gripping device may furthermore be adjusted or adjustable by the shaft to facilitate insertion of the blood lines. In addition, sufficient space is provided for all-around protected receiving of the pressure element and its suspension/storage.

Further preferably, a preferably conical holder port element (port element for short), preferably made of a soft plastic, further preferably a Luer connector, is arranged or formed at an outer end of the pressure element. The port element is complementary to a fluid/air chamber port element of a fluid chamber or air chamber of the pressure cell. For example, if the pressure cell has a female Luer connector, preferably a Luer slip connector, the port element is formed as a male Luer (slip) connector, or vice versa. Alternatively, for example, a frontal sealing surface may be provided which can be pressed by the spring mechanism against a complementary surface of the pressure cell. In this case, the ejection mechanism serves in particular to apply force or to press a connection between the capsule and the holder.

A conical shape of the port element enables a particularly robust connection, which is insensitive to slight deviations and guided during insertion, between the pressure cell and the pressure cell holder. Furthermore, there may be an additional, manually easily detachable connection between the fluid/air chamber port element of the pressure cell and the port element of the pressure cell holder, which holds the pressure cell even when the gripping device is detached. In particular, a force-fit or friction-fit connection may be provided, for example by the conical shape of the port elements acting as a wedge. In this way, when the gripping device is released, the pressure element together with the pressure cell is moved out of a position of the holding state by the ejection mechanism, so that the gripping device with the pressure cell cannot come into a gripping/engaging holding connection again. Due to the additional connection, in particular the wedge connection, which can be easily released manually, the capsule and the blood lines connected to it cannot simply fall off when the gripping device is released, but have to be additionally released or removed by a user for disassembly.

It has proven useful if a seal, preferably an O-ring, is attached to the preferably conical port element of the pressure element or if the port element is designed as a seal. In particular, the seal may be located at a contact surface at which the port elements contact each other. Thus, a tightness between the ports of the pressure cell and the pressure cell holder required for particularly accurate pressure measurement is achieved. In addition, the seal may serve as the additional, manually easily detachable connection and thus fulfill a dual function.

Alternatively, the seal may be attached to an inner surface of the shaft on the shaft inlet side of the pressure element in such a way that it rests radially on the outside of the fluid/air chamber port element of the pressure cell, or more precisely on a seal contact surface provided thereon, which may be suitably reworked, when it is inserted into the holder. On the other hand, the seal may be provided radially on the outside of the pressure cell and an inner surface of the shaft may be formed accordingly as a seal contact surface. The latter is advantageous in terms of simpler manufacturing of the seal seat as well as the replaceability of the O-ring, i.e., more maintenance-friendly. In these cases, the ejection mechanism displaces the seal in the axial direction relative to the opposite seal contact surface when the gripping device is released. In order to protect the seal, it is advantageous if the seal contact surface and/or the surface to which the seal is attached are at least slightly beveled. On the other hand, it is advantageous if these surfaces are straight cylindrical, since in this case the same sealing effect is always ensured even if the axial position of the pressure cell and the holder deviate. In a pressure cell holding device formed in this way, a compression member can be dispensed with and an alternative ejection mechanism or spring mechanism may be provided, e.g. at an abutment portion for an outer surface of the capsule.

Preferably, a pressure transmission line is provided in the pressure element, which can be connected to the pressure cell in order to transmit a pressure of the pressure cell to a pressure sensor of the extracorporeal blood treatment machine. In particular, it is advantageous if a spring force of the spring mechanism is set to press the pressure element in the holding state against the pressure cell in such a way that a gas-tight connection is provided between the pressure cell and the pressure transmission line. Thereby, the aforementioned seal of the port element of the pressure element, which is pressed or pressable against the pressure cell by the ejection mechanism, in particular spring mechanism, can provide a tight, secure connection between the fluid chamber or air chamber of the pressure cell and the pressure transmission line, which connects the capsule with a pressure sensor preferably arranged in the housing of the extracorporeal blood treatment machine. Alternatively, the pressure sensor may also be provided in the shaft directly connected to the pressure element. In particular, the spring mounting also compensates for deviations in the insertion direction (i.e., in the effective direction of the spring mechanism) when the pressure cell is attached. Alternatively, a pressure transmission line may be provided in the shaft, which may be connected to the pressure cell accordingly. In this case, the pressure element is arranged inside or on the pressure transmission line and is not connected to the capsule in a sealing manner.

According to a further aspect of the invention, at least one wall portion is provided which defines a receiving chamber for receiving the pressure cell. A surface substantially perpendicular to the wall portion may serve as a bottom of the receiving chamber, in which preferably the spring mechanism is received, in particular in which the shaft is arranged. The wall portion may protrude from the bottom of the receiving chamber at least in such a way that the pressure cell is preferably completely accommodated therein. Furthermore, preferably at least two opposite wall portions are provided, which define the receiving chamber between them. The capsule is protected in the holder by the wall portion and is less susceptible to damage by bumping, careless movements or the like. Preferably, the pressure cell is inserted into the pressure cell holder from a front side, i.e., towards the bottom and parallel to the wall portions. In principle, however, it is also possible to insert the capsule into the holder from the side or from above, in particular between two or more wall portions. If necessary, a guide for the capsule may be provided on the wall portions in this case.

Advantageously, the at least one wall portion is provided with a slit for receiving at least one blood chamber port of the pressure cell. Accordingly, the slit serves to fix the position of the capsule with respect to its blood chamber ports or to fix a position of its blood chamber ports, and is substantially U-shaped and/or adapted to the diameter of the blood chamber port in such a way that it guides the latter during insertion of the pressure cell and holds it in a form-fitting manner in three directions (i.e., in the direction of a slit end as well as transversely thereto on both sides) in the inserted state. This means that the slit may serve to receive and guide the capsule portion. As a result, insertion in an incorrect orientation can be virtually avoided. The slit can also ensure that the pressure cell is fixed in position in the three directions even during treatment. If the slit runs mainly in the direction of insertion of the capsule into the holder, this is also referred to as an axial slit. If, for example, the (axial) slit runs perpendicular to a bottom of the receiving chamber, in particular towards a housing of the extracorporeal blood treatment machine or parallel to the shaft, it can be achieved that turning of the pressure cell during extracorporeal blood treatment can be avoided.

It is furthermore preferred if an inner circumferential surface of the at least one wall portion is formed to serve as a guide for the pressure cell. For example, the capsule may be substantially round in the insertion direction and the inner circumferential surface may have a corresponding diameter or curvature. This, as well as the provision of the slit, may prevent tilting of the capsule and possibly incorrect connection as a result.

According to an advantageous embodiment, the gripping device forms at least one snap-fit hook, which is designed to engage behind the pressure cell when the pressure cell is inserted. I.e., at least one hook is provided, which projects on the pressure cell holder in the insertion direction of the pressure cell, in particular parallel to the aforementioned at least one wall portion, and has at its free end a nose projecting towards the interior of the pressure cell holder (i.e., into the receiving chamber). The snap-fit hook(s) can be bent outwards in a spring-like manner, in particular by the capsule contacting the nose when being inserted into the holder and pressing it outwards. This makes insertion of the pressure cell into the holder by a user particularly quick and easy. The snap-fit hook(s) may also form an (additional) wall portion, which forms the receiving chamber in addition to or as an alternative to the wall portion(s) described above.

For example, a single snap-fit hook may be provided, which is advantageous in that the connection can be released with one hand. I.e., in order to release the gripping device from the pressure cell, a user only has to bend the single snap-fit hook outwards with one hand, whereupon the ejection mechanism, in particular the spring mechanism, pushes the capsule out of the gripping device in such a way that re-engagement is not possible when the snap-fit hook is released. In this case, a first wall portion defining the receiving chamber and preferably surrounding it by at least half, further preferably by more than two thirds, may be provided, which in particular comprises the two slits extending perpendicularly to the bottom of the receiving chamber for receiving the blood chamber ports. In this case, the snap-fit hook can be arranged in a gap of the first wall portion to form a second wall portion. Alternatively, two opposite snap-fit hooks may be provided, which are correspondingly to be released with both hands. Two wall portions, in particular with slit ends, may be formed between the snap-fit hooks, in particular offset at an angle (preferably 90°) thereto.

The pressure cell holder according to this embodiment may, for example, be injection molded, wherein the at least one wall portion, the at least one snap-fit hook, a bottom of the receiving chamber and, if applicable, the shaft are manufactured as a single piece of material. This allows a particularly cost-effective production of the pressure cell holder.

In other words, the holder is provided with one or two (plastic) hooks, which are designed to block and hold the pressure cell (POD) in position. Furthermore, the (plastic) hooks are adapted to easily release the pressure cell and to release the capsule using one or two fingers, one for each hook.

According to another advantageous embodiment, the at least one slit is a circumferential slit running transversely to the insertion direction, in particular in the circumferential direction around the receiving chamber, through which the gripping device is separated or formed on the outside (opposite a bottom of the receiving chamber) as at least one preferably elastically bendable clamp extending in the circumferential direction, wherein the at least one blood chamber port can be inserted into the circumferential slit or pushed under the clamp by rotating the pressure cell.

This means that the pressure cell holder according to this embodiment has a preferably circumferential wall, which together with the bottom defines the receiving chamber. The wall has at least one slit, which runs in the wall parallel to the bottom, in the circumferential direction. The at least one slit opens towards an edge of the wall. In order to enable this, the at least one slit is bent at its entrance in the axial direction (i.e., perpendicular or inclined away from the bottom) and/or the wall has a projection in each region in which the slit(s) extend(s), in which the respective slit opens laterally in the circumferential direction. Similar to the aforementioned embodiment, the pressure cell holder according to this embodiment can be manufactured in a particularly simple and cost-effective manner, in particular in a single piece of material, preferably by injection molding.

In other words, the holder has two curved plastic hooks (clamps) which are designed to hold the pressure cell in position by hooking the hose connectors/blood chamber ports, wherein, in the holder according to this embodiment, the connection of the pressure cell (POD) is achieved by a partial rotation of the component (capsule). Similarly, disconnection/removal of the pressure cell is achieved by partial rotation of the capsule in the reverse direction.

In order to insert the pressure cell into the pressure cell holder, in this embodiment the capsule is positioned in such a way that its blood chamber port or blood chamber ports lies or lie in the entrance of the circumferential slit. Then, the pressure cell is (partially) rotated in such a way that the blood chamber port moves through the circumferential slit and stops/abuts at its end in an end position. This means that the capsule can be inserted into and removed from the holder in a bayonet-like manner and can be performed by the user particularly quickly, easily and with one hand.

In particular, it is advantageous if the at least one circumferential slit is widened at its (bag) end to provide a latchable port receptacle defining the end position of the respective blood chamber port. Preferably, the dimensions (diameter) of the port receptacle correspond to the dimensions of the blood chamber port. In this case, clamps/wings formed by the circumferential wall, which remain on the outside (facing in the direction opposite to the insertion direction or opposite to the bottom of the receiving chamber) of the circumferential slit or are partially separated from the circumferential wall by the circumferential slit, can be elastically bent open so that the capsule with its blood chamber ports locks into an end position at the end of the slit. For this purpose, it is in particular advantageous if a setback is provided at an outer/front edge of the wall next to the end of the circumferential end or of the port receptacle, i.e. behind an attachment of the clamp/wing. Such a setback increases the flexibility or elastic expandability of the wings/clamps provided on the outside of the circumferential slit, which means that the user requires less force, for example, to engage and disengage the pressure cell.

The spring mechanism may be provided as the ejection mechanism, wherein the circumferential slit preferably extends in the circumferential direction at least at its inner end opposite the entrance (optionally exclusively). Alternatively or additionally, the circumferential slit may run slightly obliquely (i.e., extend around the receiving chamber and obliquely towards the bottom), so that the circumferential slit forms a guide link as the ejection mechanism, through whose oblique course the capsule is also moved out of the holder perpendicular to the bottom when it is removed from the holder. Furthermore, the guide link formed in this way can be used to achieve a contact force in the direction of the bottom and a port or seal provided thereon when the capsule is inserted.

According to yet another preferred embodiment, the gripping device comprises a sleeve-shaped turning bolt or ring mandrel rotatably mounted on an outer side of the at least one wall portion and having at least one L-shaped slit. The L-shaped slit has an axial portion which opens against an insertion direction at a (frontal) outer edge of the turning bolt. In an open position of the turning bolt, the axial portion overlaps the at least one axially extending slit (axial slit) provided in the wall portion in such a way that the at least one blood chamber port can be inserted into the respective L-shaped slit and axial slit. Furthermore, the L-shaped slit has a circumferential portion which forms a circumferentially extending slit end and is adapted to hold the at least one blood chamber port in a fixed position together with the axial slit in a closed position achievable by turning the turning bolt. The pressure cell holder or gripping device according to this embodiment holds the pressure cell in a particularly stable and secure manner. It is also advantageous that the turning bolt serves as a circumferential protective wall to protect the pressure cell. Optionally, the turning bolt may be mounted on torsion springs in order to be preloaded in the closed position.

Similar to the aforementioned embodiment with the circumferential slit, the ejection mechanism may be formed by the spring mechanism and/or by a guide link, wherein the guide link in this case is provided by the circumferential portion of the L-shaped slit. If only the spring mechanism is provided, the circumferential portion preferably runs exclusively in the circumferential direction. The guide link is formed in that the course of the circumferential portion of the L-shaped slit has an axial component in addition to its circumferential component (running around the receiving chamber as well as obliquely in the direction of the bottom). As a result, when the turning bolt is turned/closed, an outer edge of the L-shaped slit presses against the respective blood chamber port in order to push the capsule into the receiving chamber/towards the bottom and to press any seals present between the fluid/air chamber port element of the capsule and the port element of the holder (e.g. the shaft or the pressure element) against each other. If a spring-loaded pressure element is present, i.e., if the ejection mechanism has both a spring mechanism and a guide link, the spring mechanism is supported by a lower edge of the L-shaped slit to eject the capsule when the capsule is released, which is advantageous in particular because of the high contact force that can be achieved and any jamming that may occur as a result, since ejection requires less force due to the guide link and also takes place in a more controlled manner. This means that automatic ejection of the capsule is provided when the capsule is removed.

In other words, the pressure cell holder is provided with a rotating outer ring which is adapted to rotate or to be manually rotated during insertion of the pressure cell. Furthermore, the rotating outer ring may be adapted to push the capsule out (from the holder) during rotation.

According to yet another advantageous embodiment, the gripping device forms a locking tab attached or displaceably mounted via a hinge-like joint in such a way that, in a closed position, the locking tab extends over the pressure cell on a side opposite the spring mechanism in order to hold the pressure cell in the holder against a spring force of the spring mechanism.

Preferably, the locking tab forms a latching edge or latching hook/latching projection at an end opposite the hinge to latch in the closed position with an associated hook or edge or groove rigidly provided on the holder. Preferably, the hook or projection is a snap-fit hook or detent and latching occurs by snapping the same. Alternatively, a manually movable hook, bracket or pin (rotatably or slidably mounted) may be provided to establish an undercut retaining engagement between the locking tab and a main body of the pressure cell holder. Furthermore, it is advantageous if the locking tab is lattice-like so that the pressure cell, in particular a main body comprising the air chamber and blood chamber, is visible even when the locking tab is closed.

In particular, if the locking tab is attached via the hinge-like joint, the locking tab may also be designed as a bending spring which can exert an additional contact force on the pressure cell inserted in the holder. Alternatively, it is conceivable to design the locking tab as a bending spring rigidly attached to the pressure cell holder, which is bent open to insert the pressure cell and which then holds the capsule in the holder (exclusively) by its spring force.

In other words, the holder is equipped with a plastic lid designed to hold the capsule in the appropriate position, wherein the plastic lid is held in the closed position by a hook. The capsule is blocked by the lid. The holder is in particular equipped with a Luer lock connector.

In each of the aforementioned embodiments described, it is advantageous if the pressure cell holder is configured such that the main part/main body of the pressure cell with the blood chamber and fluid/air chamber separated by the membrane is visible so that a user can easily monitor positioning/adjustment of the membrane separating the two chambers.

In summary, the object underlying the invention is solved by a direct connection of the capsule (POD) to the extracorporeal blood treatment machine or dialysis machine (its housing), in which the pressure cell is held in the correct position during an extracorporeal blood treatment (dialysis treatment). The holder is intended to hold/fix the capsule to a front panel of the extracorporeal blood treatment machine. Furthermore, the holder allows inspection of the adjustment of the capsule membrane (the membrane separating the chambers of the capsule). The capsule is held in the correct position by the holder and rotation of the capsule is prevented. The holder allows a transfer of pressure between the blood lines and the extracorporeal blood treatment machine. Kinking of the pressure cell with respect to hoses (e.g. a pressure transfer (hose) line between the fluid/air chamber of the capsule and the pressure sensor) is avoided. The holder allows plastic hoses to be connected. In addition, the holder is designed to be easily cleanable and to be easily removable from the machine for maintenance purposes. Furthermore, the holder may be equipped with a soft plastic connector (port element and/or seal) to connect the capsule, wherein the connector ensures sealing with the capsule. The connector made of soft plastic is mounted on a metal shaft (pressure element). Furthermore, the holder is designed to (automatically) eject the capsule when it is detached/removed.

BRIEF DESCRIPTIONS OF THE DRAWING FIGURES

The present invention is described hereinafter with reference to preferred embodiments. However, these are only illustrative in nature and are not intended to limit the scope of protection of the present invention. Furthermore, identical reference signs are used for the same components in the description of the various embodiments in order to avoid redundant descriptions of the same.

FIG. 1 shows a pressure cell holder according to the invention and a pressure cell during an insertion process according to a first embodiment.

FIG. 2 shows the pressure cell holder according to the first embodiment and the pressure cell held therein.

DETAILED DESCRIPTION

Figure 3:
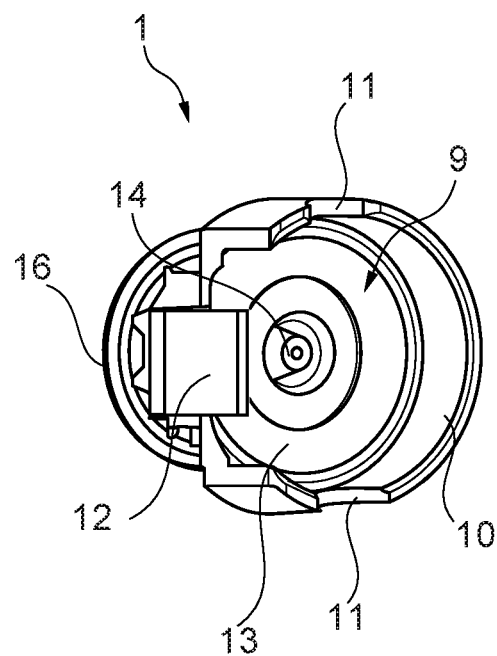
FIG. 3 shows a pressure cell holder according to the invention according to a modification of the first embodiment.

FIG. 1 shows a first embodiment of the pressure cell holder 1 according to the invention, hereinafter also referred to as holder 1 for short, while a pressure cell 2, hereinafter also referred to as capsule 2 for short, is inserted frontally therein (during an insertion process). The pressure cell 2 has a main body 3, which in this example is essentially round and forms a rigid capsule, whose interior space is separated by a membrane 4 into two chambers, a blood chamber 5 and an air chamber 6, for pressure transmission. At a front side of the pressure cell 2 shown in this view, blood chamber ports 7 are provided, which are adapted to fluidically connect the pressure cell 2, more precisely its blood chamber 5, with a blood hose line of an extracorporeal blood treatment machine. On the rear side and not shown here, the pressure cell 2 has a preferably conical air chamber port 8, in particular a Luer connector, which is connected to the air chamber 6 in a fluid-conducting manner.

In the following description of the embodiments, it should be noted that the pressure cell 2 described here by way of example and assumed in all embodiments is inserted frontally into the holder 1, which is open towards the front. Since the capsule 2 is furthermore round and the associated holder forms at least one correspondingly round receptacle, an insertion direction is hereinafter also referred to as an axial direction and a circumferential direction refers to this round shape. However, it is understandable that the pressure cell can be formed differently, e.g. cuboid-shaped, or that it may be laterally insertable into the holder without changing the functional principle of the present invention.

The pressure cell holder 1 forms a pot-like receiving chamber 9 which is adapted to receive the pressure cell 2. The receiving chamber 9 has walls or wall portions 10 on two opposite sides, forming part of a sleeve, whose inner circumference substantially corresponds to an outer circumference of the pressure cell 2, to receive and guide it. The wall portions 10 have two diametrically opposite slits 11 (hereinafter referred to as axial slits) extending in the insertion direction, which are designed to receive the blood chamber ports 7 of the pressure cell 2, thereby ensuring a rotationally fixed position of the pressure cell 2 relative to the pressure cell holder 1. In addition, the receiving chamber 9 has two snap-fit hooks or spring hooks 12 opposite each other and angularly offset (preferably by 90°) with respect to the wall portions 10 and the axial slit ends 11 provided therein, which are elastically bent radially outwards when the pressure cell 2 is inserted and, when the pressure cell 2 has reached its final position, spring back or snap in and thereby grip around an edge of the pressure cell 2 with hook projections extending radially inwards. In other words, the spring hooks 12 serve as a gripping device.

The pot-like receiving chamber 9 formed by the holder 1 furthermore has a bottom 13, in which a holder port 14 (holder port element/port portion of the holder), in particular a matching Luer connector, compatible with the air chamber port 8 of the pressure cell 2 (port portion of the capsule) is provided. The holder port 14 is spring-mounted in the holder 1, in particular in an opening in the bottom 13 of the holder 1, wherein an associated spring mechanism 15, which will be described in more detail later, is housed in a shaft 16 of the holder 1.

When the pressure cell 2 is inserted into the holder 1, the holder port 14 and the air chamber port 8 are connected to each other and are pressed together by the spring mechanism 15 in sealing manner. Furthermore, the spring mechanism 15 serves to push or eject the pressure cell 2 out of the receiving chamber 9 when the gripping device or spring hook 12 is released, i.e. it serves as an ejection mechanism. A spring deflection and a spring force of the spring mechanism 15 are dimensioned accordingly. The shaft 16 of the holder 1 further serves to attach the holder 1 to a housing of an extracorporeal blood treatment machine. More specifically, the shaft 16 has a collar for contacting the housing of the extracorporeal blood treatment machine and thus for defining a position of the holder 1 relative thereto.

FIG. 2 shows the first embodiment of the pressure cell holder 1 according to the invention, in which the pressure cell 2 is inserted. It is clearly visible that the blood chamber ports 7 of the pressure cell 2 lie in the axial slit ends 11 of the holder 1 and that the pressure cell 2 is secured against rotation in this way. It can also be seen that the spring hooks 12 grip around an edge of the pressure cell 2 and thus fix it in position in the axial direction/insertion direction.

Figure 4:
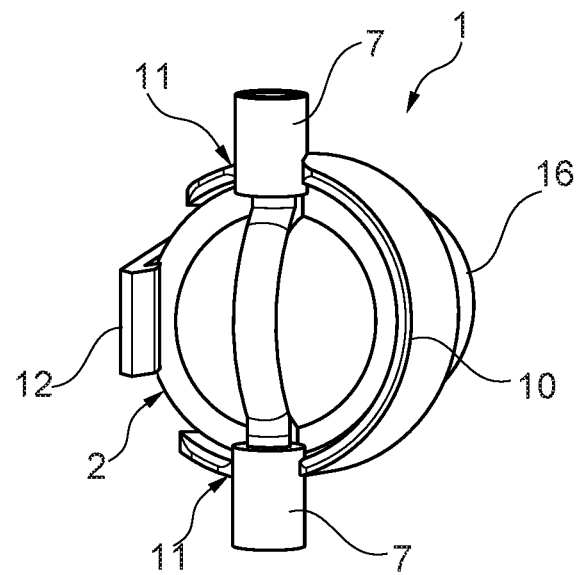
FIG. 4 shows the pressure cell holder according to the modification of the first embodiment and the pressure cell held therein.

FIG. 3 and FIG. 4 show a pressure cell holder 1 according to a modification of the first embodiment of the invention individually and with an inserted pressure cell 2. Apart from the modification, this embodiment corresponds essentially to the first embodiment, which is why only differences are explained below. In contrast to the first embodiment, the pressure cell holder 1 shown here has only a single spring hook 12 as a gripping device. Furthermore, only one wall portion 10 is provided, which extends sleeve-like around the receiving chamber 9 and is interrupted only in the area of the spring hook 12. This means that a single, continuous wall portion 10 is provided at the location where the second spring hook 12 would be in the holder 1 according to the first embodiment.

Figure 5:
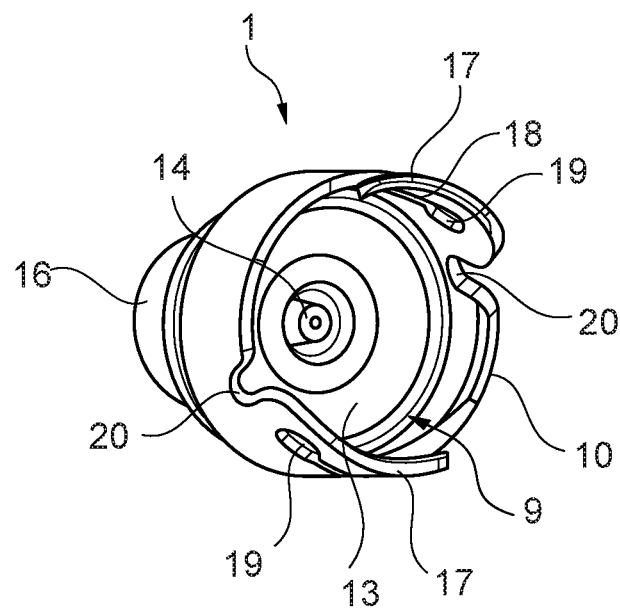
FIG. 5 shows a pressure cell holder according to the invention according to a second embodiment.

FIG. 5 shows a second embodiment of the present invention. This corresponds largely to the preceding first embodiment and differs therefrom substantially on the basis of the gripping device and on the basis of an associated insertion method, which are explained below. The receiving chamber 9 formed by the holder 1 is surrounded by a circumferential, sleeve-like wall 10 which is uninterrupted in the insertion direction/axial direction. On two diametrically opposite sides, the wall 10 forms axial prolongations 17. In each of these prolongations 17, a slit or circumferential slit 18 extending in the same circumferential direction (i.e., rotationally symmetrical) and extending partially around the receiving chamber 9 is provided, said slit serving to receive the blood chamber ports 7 of the pressure cell 2. That is, the prolongations 17 are separated or partially separated from the wall 10 by the circumferential slits 18 in such a way that they form clamps or wings as the gripping device that extend at the front (at a front edge) from the wall 10 in the circumferential direction.

The circumferential slits 18 are each uniformly narrow in their course, wherein they may widen slightly at their inputs and open towards the front/font side. In other words, the circumferential slit 18 may extend beyond the associated prolongation 17 into an intermediate portion of the wall 10 to form a kind of receptacle funnel at a transition between the prolongation 17 and this intermediate portion of the wall 10. Furthermore, the circumferential slits each form, at their other closed (sack) end, a round, expanded port receptacle 19 or a widening to latch the blood chamber ports 7. Behind the prolongations 17, at the side of the port receptacles 19, the wall 10 has a setback 20, whereby a flexibility of the clamps/wings formed by the prolongations 17 is increased.

Figure 6:
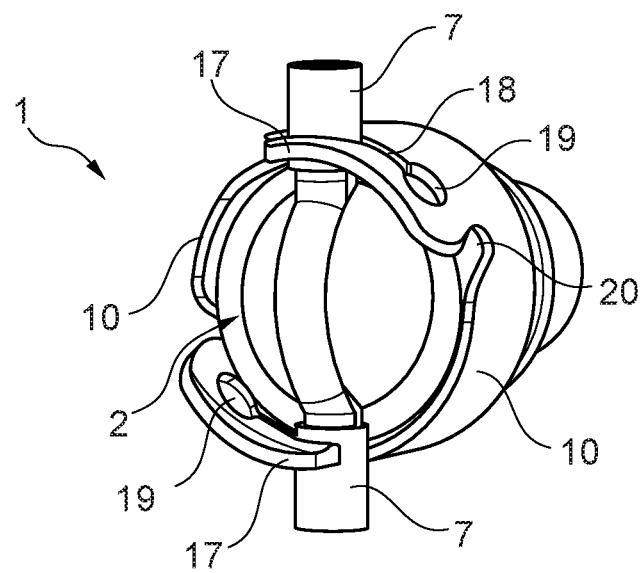
FIG. 6 shows the pressure cell holder according to the second embodiment and the pressure cell inserted therein.

In order to insert the pressure cell 2 into the holder 1, the pressure cell 2 is placed in/at the receiving chamber 9, as shown in FIG. 6, in such a way that the blood chamber ports 7 lie at the diametrically opposite inputs of the circumferential slits 18 or the reception funnels formed thereby. If the pressure cell 2 is now rotated in a bayonet-like manner in the circumferential direction relative to the pressure cell holder 1, the blood chamber ports 7 slide through the circumferential slits 18, wherein the circumferentially extending clamps formed by the prolongations 17 are elastically expanded in the axial direction and, if applicable, twist slightly. When the blood chamber ports 7 reach the circularly expanded port receptacles 19 of the circumferential slits 18, the elastically deformed clamps retract and thus lock the blood chamber ports 7 in an end position formed by the port receptacles 19. During this insertion process, as well as during an exactly reversed release of the capsule from the holder 1, the circumferential slits 18 (more precisely, the wall rims of the clamp and of a rear wall portion enclosing the circumferential slits 18) serve as a guide link, if applicable, to form at least part of the ejection mechanism according to the invention. Additionally or alternatively, a spring mechanism 15, as will be described in more detail later, is provided at/in the bottom 13 of the holder as at least a part of the ejection mechanism. The spring mechanism 15 and the guide link may also form a combined ejection mechanism.

Figure 7:
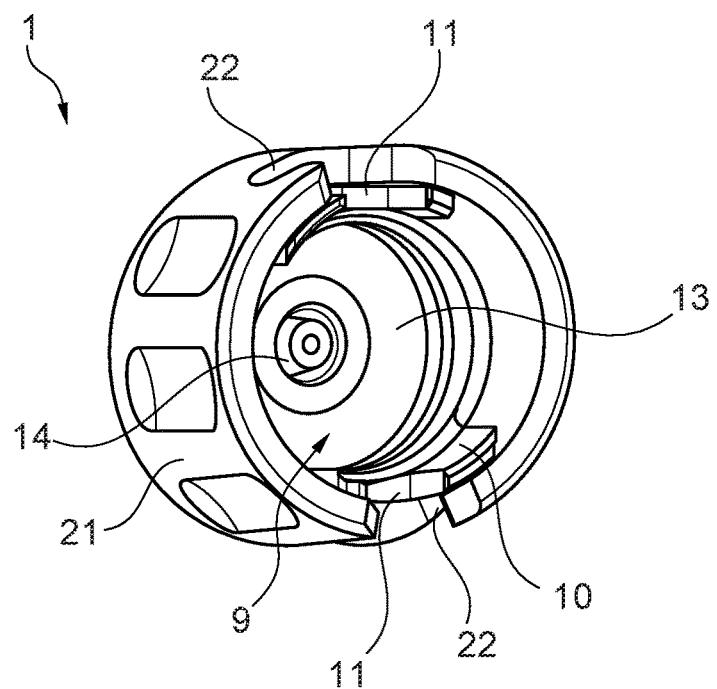
FIG. 7 shows a pressure cell holder according to the invention according to a third embodiment.
Figure 8:
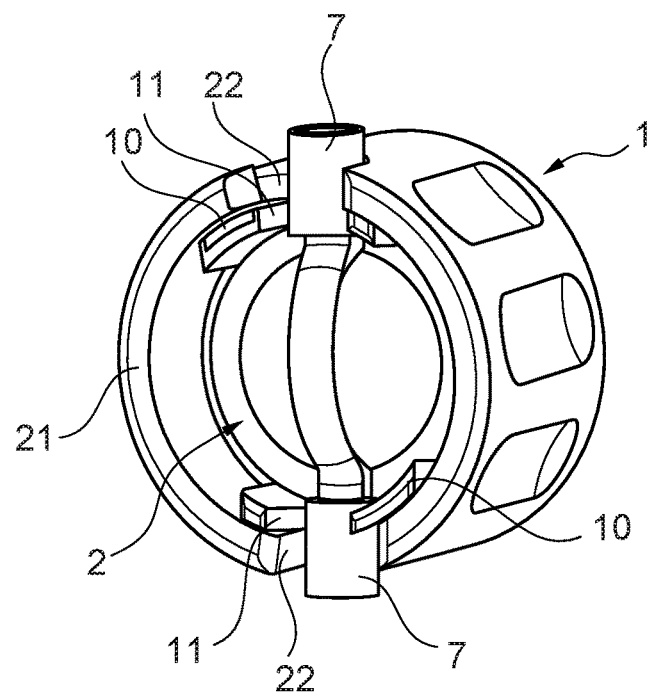
FIG. 8 shows the pressure cell holder according to the third embodiment and the pressure cell inserted therein.

FIG. 7 and FIG. 8 show a third embodiment of the present invention. Like the preceding embodiments, the holder 1 shown here has a pot-like receiving chamber 9. This receiving chamber 9 is formed by an inner sleeve with a bottom 13 and a wall with two diametrically opposite wall portions 10 extending in the insertion direction/axial direction. In the wall portions 10, similar to FIG. 1, a (respective) axial slit 11 is provided for receiving the blood hose ports 7 of the pressure cell 2. An inner surface of the wall portions 10 serves to receive and guide an outer circumference of the pressure cell 2. On the other hand, an outer surface of the wall portions 10 serves to rotatably hold and support a ring mandrel 21 relative to the receiving chamber 9. On an outer circumferential surface, the ring mandrel 21 has circumferentially distributed depressions which serve to improve gripping by a user. The ring mandrel 21 is a sleeve which has two diametrically opposite, substantially L-shaped slits 22 which are open in the same direction as the axial slits 11, towards the front/front edge of the ring mandrel 21, where they form an axial portion. Furthermore, each L-shaped slit 22 has a circumferential portion which bends from the axial portion at an angle equal to or greater than 90° and thus extends at least partially in the circumferential direction around the receiving chamber 9.

In order to fix the pressure cell 2 in the holder 1 of the third embodiment, the ring mandrel 21 is rotated relative to the receiving chamber 9 such that the openings/inputs of the axial slits 11 and the openings/inputs of the axial portions of the L-shaped slits 22 are aligned with each other, as shown in FIG. 8. Subsequently, the pressure cell 2 is inserted into the receiving chamber 9 in such a way that the blood hose ports 7 are located in the axial slit ends 11 and the axial portions of the L-shaped slit ends 22. If the ring mandrel 21 is now rotated relative to the pressure cell 2, the circumferential portions of the L-shaped slits 22 slide over the blood hose ports 7. In this way, the pressure cell 2 is secured against rotation by the axial slits 11 and secured in the axial direction by the circumferential portion of the L-shaped slits 22.

Similar to the aforementioned second embodiment, an ejection mechanism may be provided by a spring mechanism 15 provided in/at the bottom 13 of the holder, as will be described in more detail later, as at least a part of the ejection mechanism, and/or at least a part of the ejection mechanism may be provided by the circumferential portions 19 of the L-shaped slits 22 being oblique and serving as a guide link, as explained above with reference to the circumferential slits according to the second embodiment. The spring mechanism 15 and the guide link may also form a combined ejection mechanism.

Figure 9:
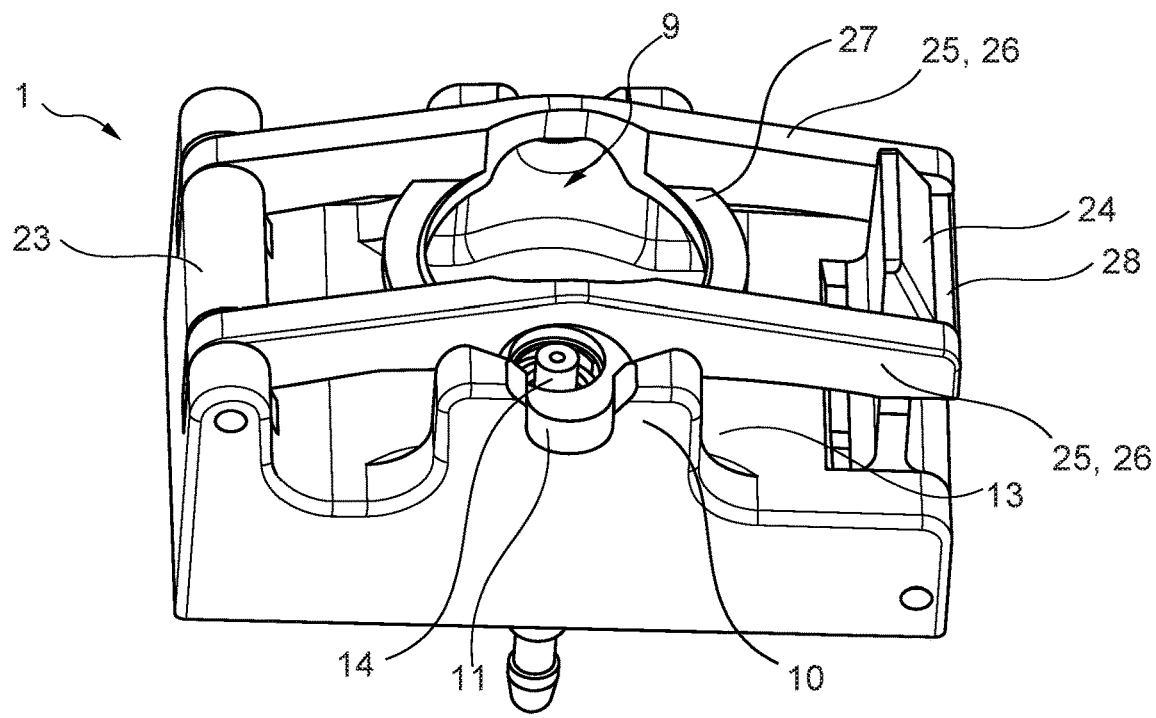
FIG. 9 shows a pressure cell holder according to the invention according to a fourth embodiment.
Figure 10:
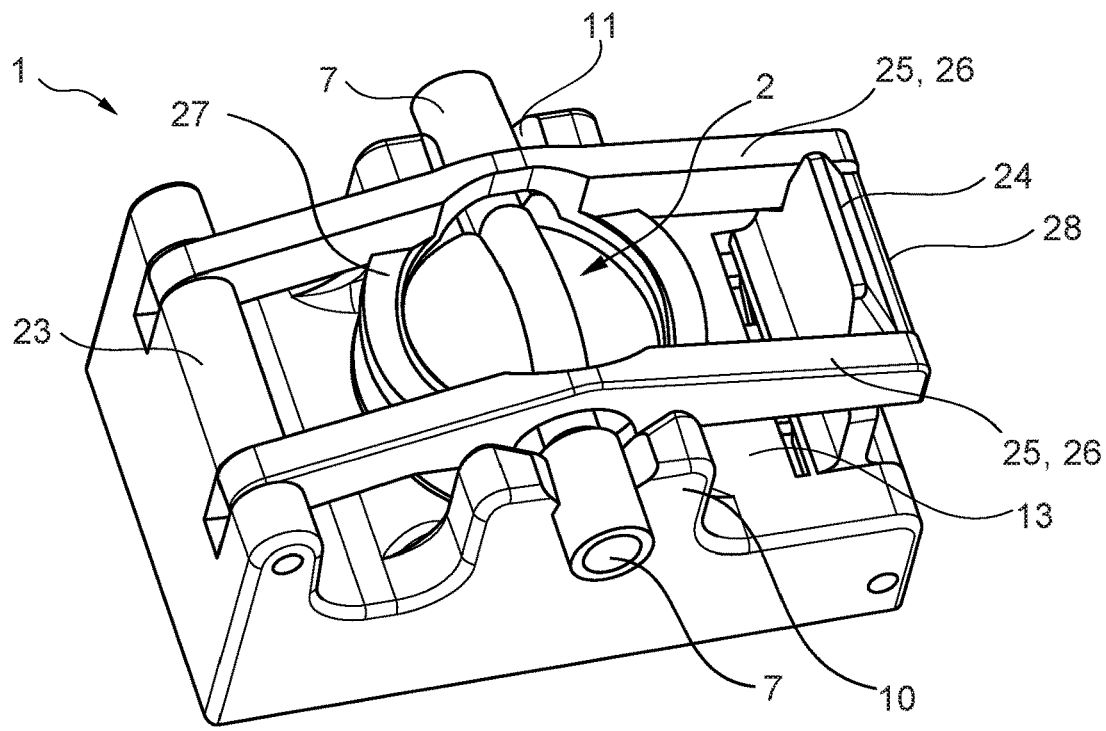
FIG. 10 shows the pressure cell holder according to the fourth embodiment and the pressure cell held therein.

FIG. 9 and FIG. 10 show a fourth embodiment of the holder 1 of the present invention with and without pressure cell 2 inserted. According to this embodiment, the holder 1 has a base plate which forms the bottom 13 and in/on which a spring mechanism 15 is provided as an ejection mechanism, in particular a spring mechanism 15 described later, as well as a holder port 14 which is compatible with the air chamber port 8 of the pressure cell 2. In this embodiment, an optionally pluggable port for quick assembly to a housing is provided at a rear side of the base plate, wherein the base plate is adapted to abut the housing in an assembly state. Furthermore, two opposite wall portions 10 are provided, in this example each terminating flatly on the outside with an edge of the base plate, said wall portions 10 extending perpendicularly to the base plate or in the insertion direction or axial direction. As in the aforementioned embodiments, the wall portions 10 form a round inner circumferential surface that serves to receive and guide an outer circumference of the pressure cell 2, and also have axial slits 11 that serve to receive the blood chamber ports 7 of the pressure cell 2.

Angularly offset (by 90°) from the opposite wall portions 10, a hinge bead 23 and a resilient locking hook 24 that is directed radially outwards are also provided opposite each other, projecting forward at the edge of the base plate. The hinge bead 23 forms a hinge with a hinge axis running parallel to the bottom 13 and the edge of the base plate, around which a locking tab 25 hinged to the hinge can rotate. The resilient locking hook 24, which is opposite the hinge bead 23, forms an snap-fit hook directed outwards, as an example here, for engagement with the locking tab 22.

The locking tab 25 substantially forms a hinge-mounted frame with two longitudinal struts 26 having a kink such that, when closed, the locking tab 25 lies roof-like over the bottom 13, in particular centrally over the pressure cell 2. Near the kink, the locking tab 25 can provide depressions for receiving the pressure cell 2 as well as an abutment ring 27 for abutment against the capsule 2 to hold it in the holder 1 against the force of the spring mechanism 15, as shown in FIG. 10. A transverse strut disposed at the free end of the locking tab 25 forms an engagement edge 28 for form-fit retention of the locking hook 24.

In order to insert the pressure cell 2 into the holder 1 according to this embodiment, the locking tab 25 is first opened or swiveled outwards/forwards. The pressure cell 2 is then inserted into the receiving chamber 9 in such a way that the blood chamber ports 7 lie in the axial slit ends 11 and the air chamber port 8 and the holder port 14 are connected to each other. The user then flips the locking tab 25 so that it presses on the main body 3 of the pressure cell 2, in particular with the abutment ring 27, in order to press the capsule against the spring mechanism 15 and create a gas-tight connection between the air chamber port and the holder port 14. In an end position, the transverse strut is pushed over the locking hook 24 so that it grips around/engages the engagement edge 28 and locks the locking tab 25.

Figure 11:
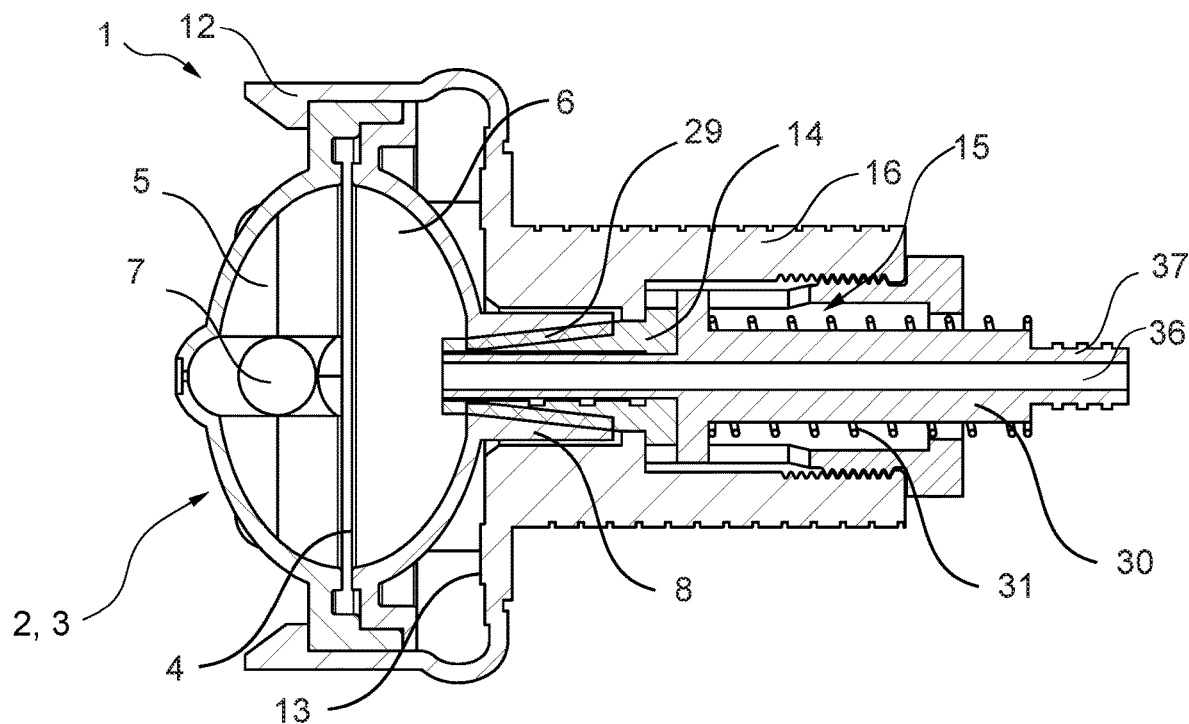
FIG. 11 shows a spring mechanism using the first embodiment as an example.

FIG. 11 shows the pressure cell holder 1 according to the first embodiment with a pressure cell 2 inserted therein in longitudinal section to illustrate a spring mechanism 15 according to the invention as the ejection mechanism or as part thereof. It is to be understood that only the first embodiment is chosen as an example and that the same spring mechanism 15 can be likewise arranged in the modified first and in the fourth embodiment as well as possibly also in the second and third embodiment, in each case in a bottom 13, in particular shaft 16, of the corresponding holders 1.

In the holder shown in FIG. 11, the two diametrically opposite snap-fit hooks or spring hooks 12 are shown, which grip around one edge of the pressure cell 2 inserted in the holder. Furthermore, the inner structure of the pressure cell 2 with the outer blood chamber 5, the inner air chamber 6, the membrane 4 arranged in between and one of the blood chamber ports 7 can be seen. An air chamber port 8 is provided on the air chamber 6 in fluid conduction therewith, which in the inserted state of the capsule 2 projects into a shaft 16 of the holder 1 and which has a conical inner surface. The conical inner surface sits on a holder port 14 forming an outer cone, which is preferably provided with a soft plastic layer 29, in particular a silicone layer, as a seal (for sealing between the outer cone and the conical inner surface). The holder port 14 is mounted on a mechanically stable (deformation-resistant, in particular compression-resistant or rigid), preferably metallic, compression member 30 and forms a pressure element together with the latter. The compression member 30 extends through the shaft 16 and is mounted therein so as to be axially displaceable via a spring assembly 31, a spiral spring being shown here as an example. The spring assembly 31 and the compression member 30 form the spring mechanism 15 as a (possibly partial) ejection mechanism. The compression member 30 has at its inner end, which may project into the housing of the extracorporeal blood treatment machine, a port 37, e.g. for use with a pressure sensor. Furthermore, the compression member 30 and the spring 31 are accommodated in a sleeve which is screwed into the shaft 16 and can thus be easily released, e.g. for maintenance purposes.

Figure 12:
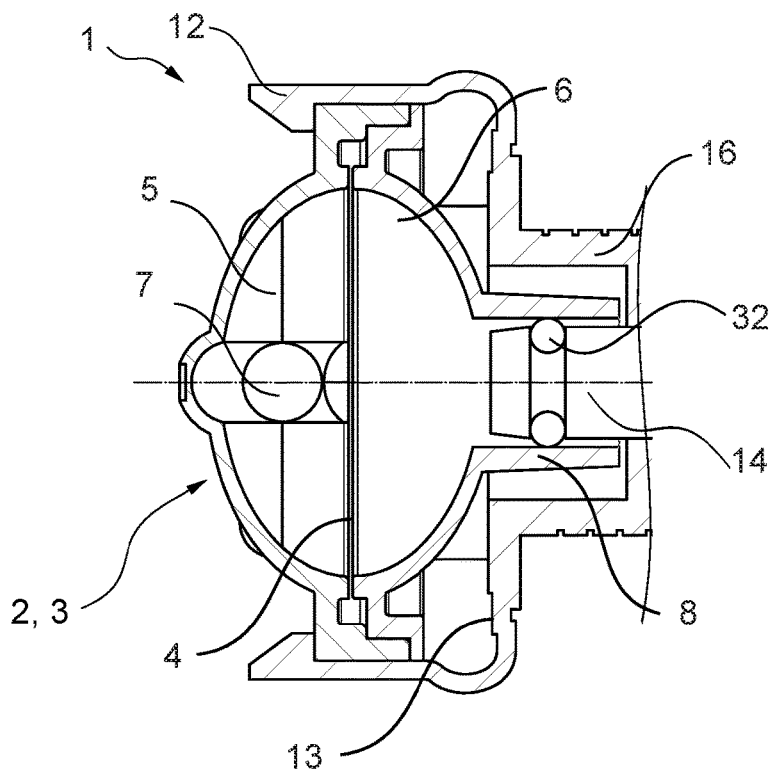
FIG. 12, FIG. 13 and FIG. 14 show advantageous variants for attaching a seal using the example of the first embodiment.
Figure 13:
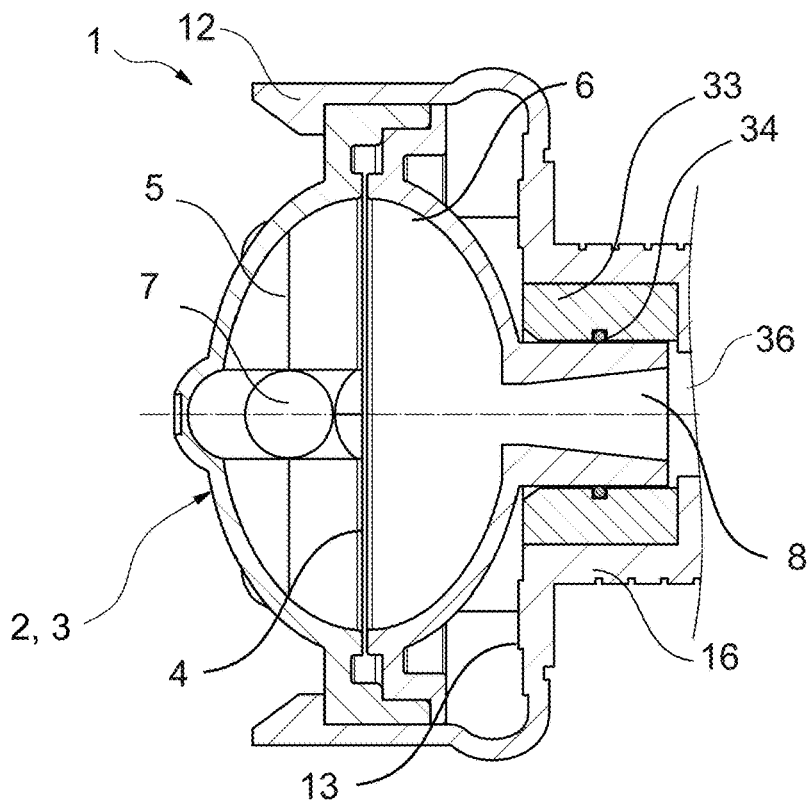
Figure 14:
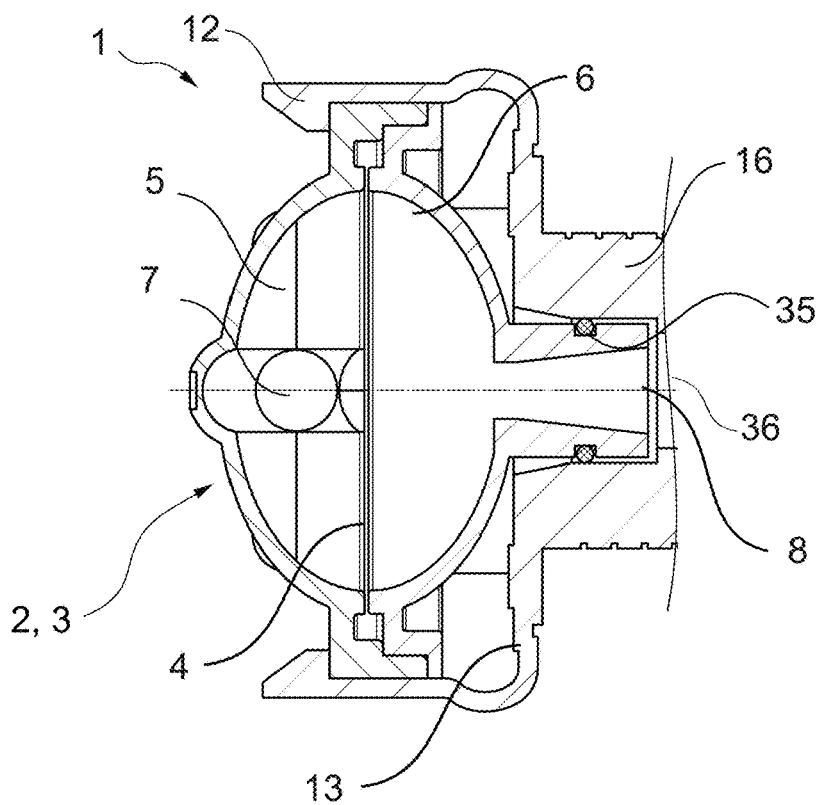

FIG. 12, FIG. 13 and FIG. 14 also show the pressure cell holder according to the first embodiment in longitudinal section with further modifications and serve to illustrate various sealing arrangements. Apart from these modifications, it can be assumed that the illustrated holders 1 are essentially of the same construction, which is why only differences are explained below. For example, it is understood that although, for simplicity, no spring mechanism 15 is shown in these figures, nevertheless such a spring mechanism 15 formed in accordance with FIG. 11 is or may be arranged therein accordingly.

As shown in FIG. 12, as an alternative to the soft plastic layer 29 not shown here, an O-ring 32 may be received as a seal on the outer cone of the holder port 14 in an outer circumference groove, making the seal easier to maintain, in particular making it replaceable. In this case, preferably a capsule 2 can be used in which the air chamber port 8 is provided with a straight cylindrical inner surface against which the O-ring 32 abuts, which is easier to manufacture and further allows a higher axial position tolerance. Furthermore, if the holder port 14 is attached to a compression member 30, i.e. is arranged on a spring mechanism 15 as (part of) an ejection mechanism, then when the gripping device, in this example the snap-fit hook, is released, the spring mechanism 15 acts on the capsule 2 via the frictional force between the O-ring and the straight cylindrical inner surface of the air chamber port 8 to eject it. In the second or third embodiment, if no spring mechanism 15 is provided, but only a guide link 18/22 is provided as an ejection mechanism, the outer cone may also be rigidly arranged in the shaft 16.

In FIG. 13, a carrier sleeve 33 is inserted at the front (facing the inserted pressure cell 2) at an inlet of the shaft 16, in which an inner circumferential groove with an O-ring 34 inserted therein is provided as a seal, alternatively or in addition to the soft plastic layer 29 or the O-ring 32 arranged on the outer cone described above. The O-ring 34 shown in FIG. 13 is in sealing contact with a straight cylindrical outer surface of the air chamber port 8 and thus seals off the air chamber port 8 from the shaft 16. This is advantageous in particular when the shaft 16 itself forms part of a pressure transmission line between the capsule 2 and the pressure sensor and can be provided both in embodiments with and without spring mechanism 15 as ejection mechanism.

In FIG. 14, in contrast to FIG. 13, no carrier sleeve 33 is provided as a carrier for the O-ring 34, but an O-ring 35 is provided in an outer circumferential groove on a straight cylindrical outer surface of the air chamber port 8 and is in sealing contact with a straight cylindrical inner circumferential surface of the shaft 16. This can be realized in embodiments with and without spring mechanism 15 according to the modification according to FIG. 13 explained above and can be provided in particular for a shaft 16 acting as a pressure transmission line, but is easier to manufacture and maintain compared to the modification according to FIG. 13.

The invention claimed is:

1. A pressure cell holder for attachment to a housing of an extracorporeal blood treatment machine, the pressure cell holder comprising:
   at least one wall portion that at least partially defines a receiving chamber for receiving a pressure cell along an insertion direction;
   a gripping device adapted to grip around a blood chamber port of the pressure cell that is received in the receiving chamber, and block the blood chamber port against movement in a direction opposite the insertion direction;
   an ejection mechanism comprising a spring mechanism and that is adapted to eject the pressure cell actively in the direction opposite the insertion direction upon release of the gripping device; and
   a pressure transmission line, the pressure transmission line being configured to be fluidically connected to a fluid chamber of the pressure cell and to transmit a fluid pressure present in the fluid chamber to a pressure sensor of the extracorporeal blood treatment machine.

2. The pressure cell holder according to claim 1, wherein the spring mechanism comprises a pressure element that is spring-mounted to be pre-tensioned upon insertion of the pressure cell into the pressure cell holder and press against the pressure cell in a holding state in which the pressure cell is held by the gripping device.

3. The pressure cell holder according to claim 2, wherein the gripping device is mounted on the housing of the extracorporeal blood treatment machine via a shaft, and wherein the pressure element is received in the shaft and is spring-mounted.

4. The pressure cell holder according to claim 2, wherein a conical holder port element comprising the pressure transmission line is arranged or formed at an outer end of the pressure element.

5. The pressure cell holder according to claim 4, wherein a spring force of the spring mechanism is set to press the pressure element in the holding state against the pressure cell in such a way that a gas-tight connection is provided between the pressure cell and the pressure transmission line.

6. The pressure cell holder according to claim 1, wherein the gripping device comprises a slit extending along the insertion direction and along a rotation direction about the insertion direction, wherein the blood chamber port is movable relative to the slit along the insertion direction, and is rotatable relative to the slit about the insertion direction.

7. The pressure cell holder according to claim 1, wherein an inner circumferential surface of the at least one wall portion forms a guide for the pressure cell.

8. The pressure cell holder according to claim 1, wherein the gripping device comprises a circumferential slit extending in the at least one wall portion circumferentially about the insertion direction from an open end to a closed end, wherein the circumferential slit is adapted to receive the blood chamber port for movement from the open end to the closed end upon rotation of the pressure cell about the insertion direction.

9. The pressure cell holder according to claim 8, wherein the circumferential slit is widened at the closed end to provide a latchable port receptacle.

10. The pressure cell holder according to claim 8, wherein a portion of the at least one wall portion located between the circumferential slit and a front edge of the at least one wall portion defines an elastically bendable clamp, and a setback is provided at a front edge of the at least one wall portion, next to an attachment point of the elastically bendable clamp.

11. The pressure cell holder according to claim 1, wherein the gripping device comprises a sleeve-shaped turning bolt rotatably mounted on an outer side of the at least one wall portion to rotate about the insertion direction between a first bolt position and a second bolt position, and having at least one L-shaped bolt slit, the at least one L-shaped bolt slit comprising:
an axial bolt slit portion which opens axially along the insertion direction from an open bolt slit end at a front face of the sleeve-shaped turning bolt, and
a circumferential bolt slit portion extending circumferentially about the insertion direction from the axial bolt slit portion to a closed bolt slit end,
wherein the blood chamber port is movable from the open bolt slit end to the closed bolt slit end, and when the blood chamber port is at the closed bolt slit end, the circumferential bolt slit portion is adapted to block the blood chamber port against movement in a direction opposite the insertion direction.

12. The pressure cell holder according to claim 8, wherein the ejection mechanism comprises a portion of the circumferential slit running obliquely towards the insertion direction from the open end to the closed end.

13. The pressure cell holder according to claim 2, wherein the gripping device forms a locking tab attached or displaceably mounted via a hinge, wherein the locking tab is pivotable about the hinge between an opened position and a closed position, wherein in the closed position the locking tab extends over the blood chamber port on a side opposite the spring mechanism in order to press and hold the pressure cell against the spring mechanism.

14. The pressure cell holder according to claim 6, wherein the slit is provided in an inner circumferential surface of the at least one wall portion and serves as a guide link.

15. A pressure cell holder for attachment to a housing of an extracorporeal blood treatment machine, the pressure cell holder comprising:
at least one wall portion that at least partially defines a receiving chamber for receiving a pressure cell along an insertion direction;
a gripping device adapted to grip around a blood chamber port of the pressure cell that is received in the receiving chamber, and block the blood chamber port against movement in a direction opposite the insertion direction;
an ejection mechanism; and
a pressure transmission line,
the ejection mechanism comprising a spring mechanism comprising a pressure element which is spring-mounted to be pre-tensioned upon insertion of the pressure cell and presses against the pressure cell in a holding state in which the pressure cell is held by the gripping device and is adapted to eject the pressure cell in the direction opposite the insertion direction actively upon release of the gripping device, and
the pressure transmission line being configured to be fluidically connectable to a fluid chamber of the pressure cell and to transmit a fluid pressure present in the fluid chamber to a pressure sensor of the extracorporeal blood treatment machine.

16. The pressure cell holder according to claim 11, wherein the circumferential bolt slit portion comprises a surface running obliquely to the insertion direction to define an ejection mechanism to move the blood chamber port in the direction opposite the insertion direction.

17. The pressure cell holder according to claim 11, wherein the blood chamber port is movable from the open bolt slit end to the closed bolt slit end by:
first moving the pressure cell relative to the sleeve-shaped turning bolt along the insertion direction, and
second rotating the sleeve-shaped turning bolt relative to the at least one wall portion from the first bolt position to the second bolt position.

18. The pressure cell holder according to claim 17, wherein the at least one wall portion comprises an axial wall portion slit extending along the insertion direction, wherein the axial wall portion slit is configured to:
align with the axial bolt slit portion when the sleeve-shaped turning bolt is in the first bolt position to thereby receive the blood chamber port within the axial wall portion slit when the blood chamber port is moved into the axial bolt slit portion, and hold the blood chamber port against rotation about the insertion direction upon rotation of the sleeve-shaped turning bolt from the first bolt position to the second bolt position.

* * * * *